United States Patent
Yokoyama et al.

(10) Patent No.: US 9,458,025 B2
(45) Date of Patent: *Oct. 4, 2016

(54) PROCESS FOR CONTINUOUS MODIFICATION OF DIHYDRATE GYPSUM AND MODIFIED DIHYDRATE GYPSUM OBTAINED BY THE PROCESS

(71) Applicant: YOSHINO GYPSUM CO., LTD., Tokyo (JP)

(72) Inventors: Itaru Yokoyama, Tokyo (JP); Kouji Katsumoto, Tokyo (JP); Yasuo Kawamura, Tokyo (JP)

(73) Assignee: YOSHINO GYPSUM CO., LTD., Tokyo (JP)

( * ) Notice: Subject to any disclaimer, the term of this patent is extended or adjusted under 35 U.S.C. 154(b) by 37 days.

This patent is subject to a terminal disclaimer.

(21) Appl. No.: 13/962,601

(22) Filed: Aug. 8, 2013

(65) Prior Publication Data

US 2014/0030173 A1  Jan. 30, 2014

Related U.S. Application Data

(63) Continuation of application No. 13/055,891, filed as application No. PCT/JP2009/063666 on Jul. 31, 2009, now Pat. No. 8,529,863.

(30) Foreign Application Priority Data

Jul. 31, 2008 (JP) ................. 2008-197920

(51) Int. Cl.
   *C01F 11/46* (2006.01)
   *C04B 11/00* (2006.01)

(52) U.S. Cl.
   CPC .............. *C01F 11/46* (2013.01); *C01F 11/466* (2013.01); *C04B 11/007* (2013.01); *C01P 2004/03* (2013.01); *C01P 2004/61* (2013.01); *C01P 2006/11* (2013.01); *Y10T 428/2982* (2015.01)

(58) Field of Classification Search
   CPC ..... C01F 11/46; C01F 11/466; C04B 11/007
   See application file for complete search history.

(56) References Cited

U.S. PATENT DOCUMENTS

| 3,410,655 A | 11/1968 | Ruter et al. |
| 4,071,603 A | 1/1978 | Williams |

(Continued)

FOREIGN PATENT DOCUMENTS

| JP | 52-147625 | 12/1977 |
| JP | 55-047224 | 4/1980 |

(Continued)

OTHER PUBLICATIONS

Machine translation of JP2006273599, publication date, Oct. 2006.*

(Continued)

*Primary Examiner* — Jun Li
(74) *Attorney, Agent, or Firm* — Hamre, Schumann, Mueller & Larson, P.C.

(57) ABSTRACT

A process for the continuous modification of dihydrate gypsum includes calcining dihydrate gypsum into hemihydrate gypsum and recrystallizing the hemihydrate gypsum in an aqueous slurry to convert the hemihydrate gypsum into modified dihydrate gypsum of different crystalline form. The aqueous slurry in a recrystallization reaction tank is maintained at a constant temperature under stirring, and a feed rate of the hemihydrate gypsum to the recrystallization reaction tank and a discharge rate of the recrystallized dihydrate gypsum are controlled to substantially equal. Dihydrate gypsum as a starting raw material can be converted into high-purity, modified dihydrate gypsum of large crystals by recrystallizing the starting dihydrate gypsum after it is once calcined into hemihydrate gypsum.

12 Claims, 5 Drawing Sheets

(56) References Cited

U.S. PATENT DOCUMENTS

| | | | |
|---|---|---|---|
| 4,091,080 | A | 5/1978 | Kosugi et al. |
| 4,424,196 | A | 1/1984 | Palmer et al. |
| 4,722,866 | A * | 2/1988 | Wilson et al. ............. 428/411.1 |
| 4,994,248 | A | 2/1991 | Slater et al. |
| 5,094,716 | A | 3/1992 | Letscher |
| 8,529,863 | B2 * | 9/2013 | Yokoyama et al. .......... 423/555 |
| 2003/0125581 | A1 | 7/2003 | Gerkema et al. |
| 2008/0009565 | A1 * | 1/2008 | Wittbold et al. ................ 524/4 |
| 2010/0062255 | A1 | 3/2010 | Aksela et al. |

FOREIGN PATENT DOCUMENTS

| | | | |
|---|---|---|---|
| JP | 02-160620 | 6/1990 | |
| JP | 06/256014 | 9/1994 | |
| JP | 07-330329 | 12/1995 | |
| JP | 2002-029740 | 1/2002 | |
| JP | 2003-128416 | 5/2003 | |
| JP | 2004-345900 | 12/2004 | |
| JP | 2005-014389 | 1/2005 | |
| JP | 2006-143503 | 6/2006 | |
| JP | 2006-273599 | 10/2006 | |
| JP | 2006273599 | * 10/2006 | ............. C01F 11/46 |
| JP | 2008-081329 | 4/2008 | |
| JP | 2010-013304 | 1/2010 | |

OTHER PUBLICATIONS

Katsumoto et al.: "Formation of Large Plate-Lake Calcium Sulfate Dihydrate from Waste Gypsum Board"; Nihon University, Faculty of Science and Technology, 2001, pp. 1250-1251 with partial English translation (6 pages).

"Handbook of Cement, Gypsum & Lime": The Society of Inorganic Materials, Japan; 1995, pp. 367-368 with partial translations (6 pages).

Extended European Search Report, Jun. 1, 2015; European Patent Application No. 15152774.4 (7 pages).

"Development of Technology for Recycling Dismantled/Waste Gypsum Boards: Progress Report"; chap 4 "Development of Dismantled/Waste Gypsum Boards Modification Technology"; New Energy and Industry Technology Development Organization in FY 1999, ed., Gypsum Board Association of Japan, Mar. 2001 (70 pages, concise explanation of the relevance explained in translated Notice).

Yoshiyuki Kojima: "Particle Size Control of Gypsum Dihydrate"; Journal of the Society of Inorganic Materials, Japan, 15(335), pp. 219-228 (2008) (12 pages, concise explanation of the relevance explained in translated Notice).

"Chemical Encyclopedia 7", Section of Surface Active Agent, pp. 539-540, ed. Kagaku Daijten Henshuiinkai, Oct. 30, 1961 (3 pages, concise explanation of the relevance explained in translated Notice).

"Chemical Encyclopedia 4", Section of Antiforming Agent, p. 818, ed. Kagaku Daijten Henshuiinkai, Oct. 30, 1961 (2 pages, concise explanation of the relevance explained in translated Notice).

"Chemical Encyclopedia 5", Section of Elutriation, p. 75, ed. Kagaku Daijten Henshuiinkai, Oct. 30, 1961 (2 pages, concise explanation of the relevance explained in translated Notice).

Yoshiyuki Kojima et al.: "Preparation of Large-Sized Gypsum Dihydrate from Waste Gypsum Board under Coexisting Ammonium Chloride"; Journal of the Society of Inorganic Materials, Japan, 11, pp. 287-292 (2004) (6 pages, concise explanation of the relevance explained in translated Notice).

JPO Notice, May 12, 2015; Japanese Patent Application No. JP 2014-230513; with partial English translation (72 pages).

Japanese Patent Notice, issued in the corresponding Japanese Patent Application No. 2015-213801, dated Apr. 5, 2016, 35 pages.

Kagaku Daijiten, "Chemical Encyclopedia", Kyoritsu Shuppan Co., Ltd., vol. 3, Sep. 30, 1960.

* cited by examiner

PROCESS FOR CONTINUOUS MODIFICATION OF DIHYDRATE GYPSUM AND MODIFIED DIHYDRATE GYPSUM OBTAINED BY THE PROCESS

TECHNICAL FIELD

This invention relates to a process for the continuous modification of dihydrate gypsum, and also to modified dihydrate gypsum obtained by the process. According to the process, existing dihydrate gypsum, such as natural gypsum or by-product gypsum from one of various sources, is continuously modified into a crystalline form different from the original crystalline form by once calcining the existing dihydrate gypsum into hemihydrate gypsum and then recrystallizing the resulting hemihydrate gypsum.

BACKGROUND ART

Over years, dihydrate gypsum has been extensively used as a raw material for construction materials such as gypsum boards and gypsum plasters. Dihydrate gypsum includes two types, one being natural gypsum, and the other chemical gypsum. As chemical gypsum, a majority is by-product gypsum obtained as a by-product of various chemical processes such as those to be described below, although there is one synthesized from sulfuric acid and calcium carbonate. By-product gypsum includes flue gas desulfurization gypsum by-produced in flue gas desulfurization processes, phosphogypsum produced by treatment of rock phosphate with sulfuric acid, neutralization gypsum obtained by neutralizing sulfuric acid occurred upon production of titanium oxide, polyaluminum chloride by-product gypsum by-produced upon production of polyaluminum chloride as a water treatment flocculent, and the like. Average particle sizes of these chemical gypsums generally range from 30 to 60 µm, and chemical gypsum of crystals greater than this particle size range is very rare. There are, however, applications for which dihydrate gypsum of crystals greater than 60 µm in average particle size are desired. α-Hemihydrate gypsum of large size and regular shape is known to be obtainable, for example, when dihydrate gypsum formed of crystals greater than 60 µm in average particle size is used as a material upon producing α-hemihydrate gypsum by calcining dihydrate gypsum.

However, no technology has been established yet for continuously modifying, by a simple method, existing dihydrate gypsum as a raw material—such as natural gypsum, such by-product gypsum as described above, or waste gypsum—into dihydrate gypsum, which is high in purity, is uniform in particle size and is formed of large crystals having an average particle size of greater than 60 µm, for example, an average particle size of 64 µm or greater. Such a technology, if established, will be extremely useful from a practical standpoint. When a gypsum product such as a gypsum plaster is used, on the other hand, darkness or dark stains may be produced in or on the gypsum product due to a soluble or insoluble impurity which is other than calcium sulfate and is contained in a gypsum material. Despite such a potential problem, there is not much gypsum material that does not contain an impurity as a cause of such darkness or dark stains and is high in brightness. If a technology capable of easily modifying dihydrate gypsum, which has been obtained from natural gypsum, by-product gypsum, waste gypsum or the like, into a high-purity white gypsum material can be developed, such a technology will be very useful especially for providing a raw material usable for preparing a product that requires high brightness, such as dental gypsum.

Concerning the production of dihydrate gypsum of large particle size, it has been proposed, upon production of dihydrate gypsum from waste sulfuric acid and calcium carbonate, to divide a reaction tank into two sections and to make the solute concentration of gypsum more uniform in the reaction tank for maintaining supersaturation at a degree adequate for the growth of crystals over a long time (see Patent Document 1). However, this process relates to an improvement in the case of obtaining dihydrate gypsum by a chemical synthesis, and does not modify an existing or small-diameter gypsum material, such as natural gypsum or such by-product gypsum as described above, into dihydrate gypsum of large crystal particle size and high purity.

As to the elimination of impurities from a gypsum material, a proposal has also been made to modify the gypsum material by efficiently and surely eliminating chlorine or chlorides which adhere or are included or solid-solutioned inside the gypsum material (see Patent Document 2). With a view to facilitating recycling of gypsum products, a further proposal has also been made about a process for treating waste gypsum to re-collect dihydrate gypsum of large average particle size (see Patent Document 3). In these technologies, dihydrate gypsum is once converted into hemihydrate gypsum, which is then converted back into dihydrate gypsum at a temperature of 80° C. or lower. Further, Patent Document 3 discloses subjecting waste gypsum to wet grinding, incorporating in the resulting slurry an alkali metal or alkaline earth metal hydroxycarboxylate having from 4 to 6 carbon atoms, conducting heat treatment under pressure to convert dihydrate gypsum into hemihydrate gypsum, and then mixing dihydrate gypsum of from 40 to 60 µm in average particle size with the slurry of hemihydrate gypsum to convert the hemihydrate gypsum into dihydrate gypsum. Patent Document 3 describes in each example that dihydrate gypsum of from 42 to 62 µm in average particle size was obtained.

However, the technologies described in Patent Documents 2 and 3 mentioned above are still unable to achieve the modification of a gypsum material, which is composed of existing dihydrate gypsum such as natural gypsum, by-product gypsum or waste gypsum, into dihydrate gypsum which is as large as exceeding 60 µm in average particle size, is high in purity and is applicable to a wide range of applications. This modification is a problem to be solved by the present invention. In each of the inventions referred to in the above, the treatment process is batchwise and is not a continuous treatment process. Therefore, these technologies involve a problem, which is to be solved, in that they should be improved into technologies capable of achieving increased productivity and being applied to stable industrial production.

A still further proposal has been made to subject dihydrate gypsum to dry calcination to convert it into hemihydrate gypsum, to formulate the resulting hemihydrate gypsum into a slurry form, and then to hydrate the hemihydrate gypsum at a temperature of from 10 to 60° C. to obtain dihydrate gypsum of large particle size (see Patent Document 4). A preferred crystallizer is illustrated in FIG. 1 of Patent Document 4. The use of the crystallizer is described to permit continuous dehydration treatment. According to this technology, however, a suspension or supernatant water in the crystallizer is caused to overflow by charging hemihydrate gypsum or a suspension of hemihydrate gypsum. Accordingly, additional facilities are needed for the reutilization or treatment of the overflowed slurry. According to a study by the present inventors, this technology is accompanied by a drawback in that, as the slurry in the crystallizer is caused to overflow, the residence time of the slurry varies and the resulting dihydrate gypsum does not remain stable in particle size.

When modified dihydrate gypsum is white, it can be used as a raw material for preparing products such as dental gypsum, leading to an expansion in application fields. Although there is no specification as to the brightness of gypsum, the brightness that a human can feel "white", for example, on paper is considered to be 80 or so in terms of Hunter's brightness. It is to be noted that the greater this value is, the whiter it is. Patent Documents 2 to 4 described above do not contain any description about such a technical problem.

PRIOR ART DOCUMENTS

Patent Documents

Patent Document 1: JP-A-2006-143503
Patent Document 2: JP-A-2004-345900
Patent Document 3: JP-A-2006-273599
Patent Document 4: JP-A-2008-81329

DISCLOSURE OF THE INVENTION

Problem to be Solved by the Invention

Therefore, an object of the present invention is to provide a process for converting dihydrate gypsum as a raw material—such as natural gypsum, one of various by-product gypsums or waste gypsum—into modified dihydrate gypsum of a crystalline form different from the original crystalline form by once calcining the dihydrate gypsum into hemihydrate gypsum and then continuously recrystallizing the hemihydrate gypsum, and especially, a modification process for the gypsum material, which continuously modifies the gypsum material into dihydrate gypsum which is in the form of large crystals, said large crystals being unavailable in general and having an average particle size preferably of greater than 60 μm, more preferably of 64 μm or greater, which is uniform in particle size and which has a high purity of 95% or higher. Another object of the present invention is to provide a modification process for dihydrate gypsum, which makes it possible to obtain, by a simple continuous treatment method, modified dihydrate gypsum which is high in purity and large in crystal particle size, has a white color, and can prevent the occurrence of darkness or dark stains in or on a gypsum product such as a gypsum plaster when the gypsum product is produced, although such darkness or dark stains would otherwise occur due to impurities other than calcium sulfate contained in gypsum as a raw material such as natural gypsum, one of various by-product gypsums or waste gypsum.

Means for Solving the Problem

The above-described objects can be achieved by the present invention to be described hereinafter. Described specifically, the present invention provides a process for continuously modifying dihydrate gypsum, said process including (a) a hemihydration step of subjecting the dihydrate gypsum as a starting raw material to wet calcination or dry calcination to convert the dihydrate gypsum into hemihydrate gypsum, (b) a charging step of feeding the hemihydrate gypsum to an aqueous slurry in a recrystallization reaction tank, (c) a recrystallization step of hydrating and recrystallizing the hemihydrate gypsum into modified dihydrate gypsum of a crystalline form different from the dihydrate gypsum as the raw material, and (d) a discharge step of discharging a portion of the modified dihydrate gypsum from the recrystallization reaction tank, wherein at least the steps (b) to (d) are conducted continuously or intermittently, a feed rate of the hemihydrate gypsum in the charging step (b) and a discharge rate of the modified dihydrate gypsum in the discharge step (d) are substantially equal to each other, and in the recrystallization step (c), the aqueous slurry in the recrystallization reaction tank is maintained at a constant temperature under stirring such that the aqueous slurry becomes uniform to avoid solid-liquid separation; and also modified dihydrate gypsum modified by the process.

As more preferred embodiments of the above-described continuous modification process for dihydrate gypsum, it may be mentioned to meet the below-described requirements in addition to the foregoing requirements. Specifically, to more stably modify into dihydrate gypsum of greater and uniform particle size and high purity, it is preferred that the feed rate of the hemihydrate gypsum in the charging step (b) and the discharge rate of the modified dihydrate gypsum in the discharge step (d) are each controlled to be not more than 20% of a total amount of gypsum in the recrystallization reaction tank per hour, that the temperature of the aqueous slurry in the recrystallization reaction tank in the recrystallization step (c) is controlled to be higher than 80° C. but not higher than 90° C., or that to the recrystallization reaction tank in the recrystallization step (c), dihydrate gypsum is continuously or intermittently added as crystal seeds in a range of from 0.01 wt % to not greater than 5 wt % based on the hemihydrate gypsum to be fed to the recrystallization reaction tank. In addition to the above-described requirements, it is also preferred that to at least one of the aqueous slurry in the hemihydration step (a) when the wet calcination is performed or the aqueous slurry in the recrystallization step (c), a surfactant and/or a defoaming agent is added in a range of from 0.01 to 0.2 wt % based on the dihydrate gypsum as the raw material to eliminate darkness components contained in the dihydrate gypsum as the raw material.

Advantageous Effects of the Invention

According to the present invention, there is provided a continuous modification process that can modify, through a simple continuous treatment, dihydrate gypsum as a raw material—such as natural gypsum, one of various by-product gypsums or waste gypsum—into modified dihydrate gypsum of a different crystalline form, for example, dihydrate gypsum having a crystallized average particle size of greater than 60 μm, more preferably an average particle size of 64 μm or greater. Described specifically, there is provided a continuous modification process that can modify raw dihydrate gypsum into modified dehydrate gypsum of a different crystalline form, for example, dihydrate gypsum, which has a crystallized average particle size of greater than 60 μm and moreover and a purity as high as, for example, 95% or higher and is uniform in particle size, by once calcining the raw dihydrate gypsum into hemihydrate gypsum and then continuously conducting stable recrystallization treatment. According to the present invention, there is provided especially a continuous modification process for dihydrate gypsum, which can modify dihydrate gypsum as a raw material—such as natural gypsum, one of various by-product gypsums or waste gypsum—into crystallized dihydrate gypsum having an average particle size of 64 μm or greater and/or an untamped density of 0.8 or greater. According to a preferred embodiment of the present invention, there is also provided a modification process for a gypsum material, which can continuously obtain modified dihydrate gypsum that is high in purity and large in crystal particle size, has a white color, and can prevent the occurrence of darkness or dark stains in or on a gypsum product such as a gypsum plaster when the gypsum product is produced, although such darkness or dark stains would otherwise occur due to impurities other than calcium sulfate contained in the gypsum material.

MODES FOR CARRYING OUT THE INVENTION

Figure 1:
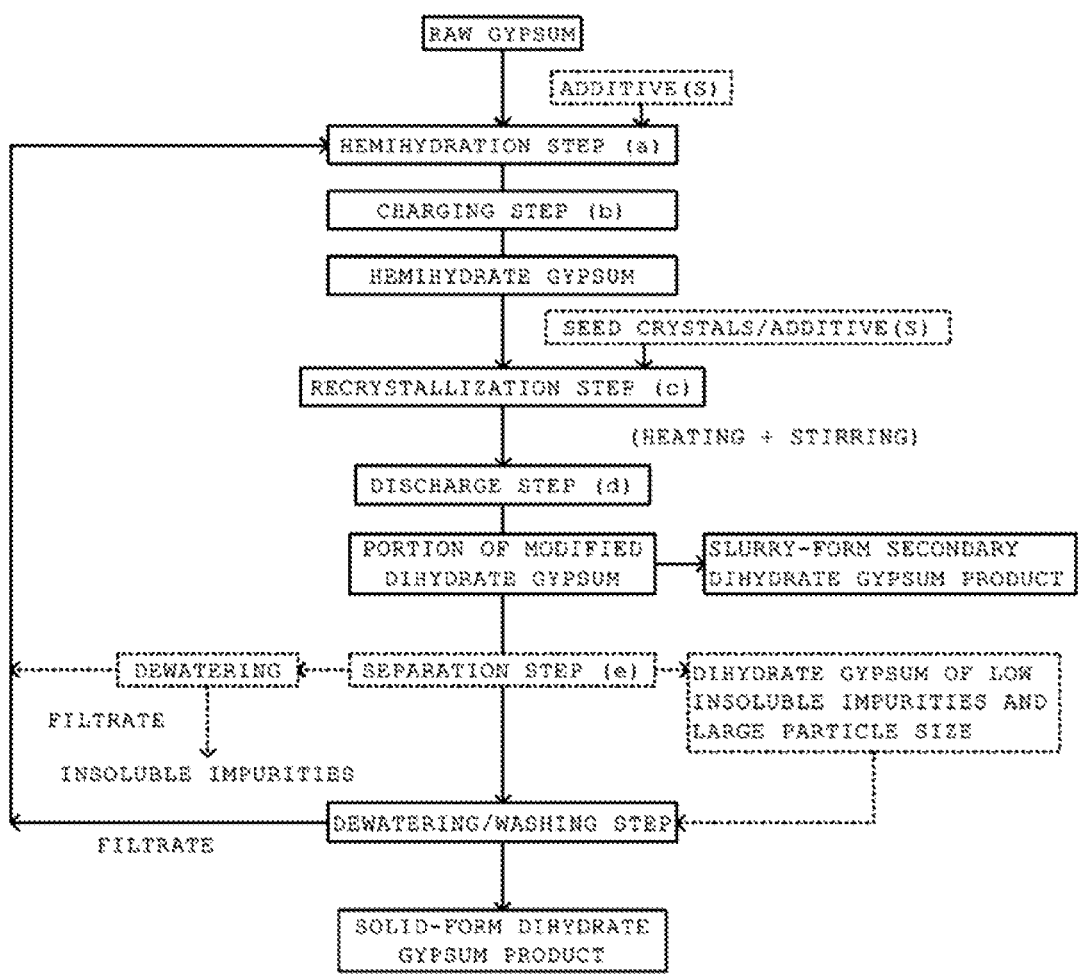
FIG. 1 is a diagram showing one example of a flow of a continuous modification process of the present invention for dihydrate gypsum.

The present invention will hereinafter be described based on preferred embodiments. As dihydrate gypsum to be modified in the present invention, those employed widely as raw materials for gypsum products are all usable. Described specifically, natural gypsum, synthetic gypsum, various by-product gypsums obtained as by-products of various chemical processes, waste gypsum molds, waste gypsum derived from gypsum board wastes occurred upon new construction or demolition of detached houses, multiple dwelling houses or condominiums, and the like are each usable as a raw material insofar as it is dihydrate gypsum. In the present invention, dihydrate gypsum composed of such a raw material as mentioned above (hereinafter called "raw gypsum" is modified into dihydrate gypsum, which has such a large crystal size, high purity and uniform particle size as generally unavailable to date and can be used as an optimal gypsum material for various applications. The process according to the present invention includes at least a hemihydration step of calcining such raw gypsum as mentioned above into hemihydrate gypsum, a charging step of feeding the hemihydrate gypsum to an aqueous slurry in a recrystallization reaction tank, a recrystallization step of hydrating and recrystallizing the hemihydrate gypsum in the aqueous slurry to convert it into modified dihydrate gypsum (hereinafter called "modified dihydrate gypsum") of a crystalline form different from the raw gypsum, and a discharge step of discharging a portion of the modified dihydrate gypsum from the recrystallization reaction tank. In the recrystallization step, the aqueous slurry in the recrystallization reaction tank is maintained at a constant temperature (preferably, a temperature of higher than 80° C. but not higher than 90° C.) under stirring such that the aqueous slurry is uniformly dispersed without separation of a solid component and a liquid component from each other in the aqueous slurry. In the present invention, the feeding of the hemihydrate gypsum to the recrystallization reaction tank and the discharging of the recrystallized and modified dihydrate gypsum from the recrystallization reaction tank are conducted continuously or intermittently while controlling the feed rate of the hemihydrate gypsum and the discharge rate of the recrystallized and modified dihydrate gypsum such that they become substantially equal to each other (preferably such that the feed rate and discharge rate are each controlled at 20% or smaller of the total amount of gypsum in the recrystallization reaction tank), and by a continuous treatment, the hemihydrate gypsum is therefore hydrated and recrystallized into the modified dihydrate gypsum. A detailed description will hereinafter be made.

[Raw Gypsum]

In the modification process of the present invention for dihydrate gypsum, it is more advantageous if raw gypsum to be modified is one having an average particle size of 30 μm or smaller. The reason for this is that, especially when dihydrate gypsum formed of such small crystals as having an average particle size of 30 μm or smaller is calcined into a raw material for a calcined gypsum product, the amount of water needed to be mixed increases significantly, the dihydrate gypsum hence involves a problem that applications in which the dihydrate gypsum is usable are limited, and therefore, there is a long-standing desire for the development of a technology for modifying the dihydrate gypsum into dihydrate gypsum that permits an expansion in application fields. If raw gypsum the average particle size of which is 30 μm or smaller as mentioned above can be modified by a continuous treatment into dihydrate gypsum formed of large crystals of greater than 60 μm, especially 64 μm or greater and having high purity and uniform particle size although such dihydrate gypsum has heretofore been not available readily, such raw gypsum can be rendered widely usable for various applications, and therefore, becomes very useful from the industrial standpoint.

[Hemihydration Step]

In the modification process of the present invention for dihydrate gypsum, raw gypsum such as that described above is first calcined into hemihydrate gypsum in the hemihydration step. No particular limitation is imposed on the calcination method. The calcination temperature is generally from 100° C. to 250° C., but is not particularly limited. It is, however, preferred that in the hemihydration step, the raw gypsum is surely calcined into hemihydrate gypsum, an intermediate, in its entirety and the combined water in the resulting hemihydrate gypsum is lowered, for example, to 8% or less. As hemihydration methods usable in the present invention for raw gypsum, there are, for example, a method that uses a vertical calciner, rotary calciner, direct-fired calciner or indirectly-heated calciner or the like and conducts dry calcination to obtain β-hemihydrate gypsum and a method that conducts wet calcination (pressurized calcination) such as a pressurized aqueous-solution method that through a catalytic reaction with pressurized vaporized water or liquid water, the raw gypsum is transformed to obtain α-hemihydrate gypsum. In the pre sent invention, either of the dry method and the wet method can be used. In this case, the operation of dry calcination or pressurized calcination may be conducted either continuously or by a batchwise calcination method. From the standpoint of operation, continuous calcination is preferred for continuously conducting modification in a stable state. Upon obtaining hemihydrate gypsum in a continuous manner, however, it is preferred to adopt a continuous calcination method designed to repeat the operation of dry calcination or pressurized calcination such that the dry calcination or pressurized calcination is conducted in multiple stages. If continuous calcination is conducted through only one calciner, it is probabilistically unavoidable that a portion of fed raw gypsum would short pass still in the form of dihydrate gypsum. If designed to conduct the calcination of dihydrate gypsum in multiple stages, on the other hand, raw gypsum can be more surely converted into hemihydrate gypsum in the hemihydration step. Described more specifically, as the contents of the calciner in which calcination is conducted are mixed by an agitator, a portion of the raw gypsum which is being continuously fed may come out, as it is, as an admixture with the calcined hemihydrate gypsum. By constructing the equipment such that the admixed raw gypsum can be calcined in subsequent calciner or calciners, the hemihydration of the raw gypsum can be fully conducted. As a consequence, such construction makes it possible to more surely convert raw gypsum into hemihydrate gypsum.

(Crystal Habit Modifier)

In the pressurized aqueous-solution method (pressurized calcination) that transforms raw gypsum into α-hemihydrate gypsum through the catalytic reaction with vaporized water or liquid water, it is known to add a carboxylic acid or a salt thereof as a crystal habit modifier. Such a carboxylic acid or a salt thereof is also suitably usable in the present invention. Carboxylic acids and their salts, which are usable upon conducting the transformation, include gluconic acid, succinic acid, maleic acid, tartaric acid, malic acid, acrylic acid and polycarboxylic acids, and their salts. Such a carboxylic acid or a salt thereof may be added preferably in such an amount that it ranges from 0.1 to 2.0 wt % based on the hemihydrate gypsum to be fed. According to another study by the present inventors, recrystallized and modified dihydrate gypsum of particularly large average particle size and high purity can be readily obtained when raw gypsum is transformed into α-hemihydrate gypsum by such a method as described above and a solution containing the resulting hemihydrate gypsum (hereinafter called "a hemihydrate gypsum slurry or a slurry") is fed, as it is, to the next recrystallization step to recrystallize the same. When a carboxylic acid or a salt thereof is not used upon transformation of raw gypsum into hemihydrate gypsum as in the case of dry calcination, it is, therefore, preferred to control such that such a carboxylic acid or a salt thereof as mentioned above is incorporated at the above-described concentration in a hemihydrate gypsum slurry in a recrystallization reaction tank to be used in the next recrystallizing step.

(Particle Size of Hemihydrate Gypsum)

According to a further study by the present inventors, when compared with the recrystallization conditions being controlled the same, the characteristics such as average particle size of modified dihydrate gypsum to be obtained finally are affected by the particle size and characteristics of hemihydrate gypsum as an intermediate via which the process according to the present invention is required to proceed. Described specifically, the average particle size of the resulting α-hemihydrate gypsum is 30 μm or greater according to the above-described pressurized aqueous-solution method. When the process is allowed to proceed via such α-hemihydrate gypsum of 30 μm or greater as an intermediate, the recrystallized and modified dihydrate gypsum takes the form of crystals having a greater average particle size. On the other hand, modified dihydrate gypsum recrystallized via α-hemihydrate gypsum of smaller than 30 μm is inferior to that recrystallized via α-hemihydrate gypsum of 30 μm or greater in average particle size, but can be modified into dihydrate gypsum of a crystal particle size greater than that of dihydrate gypsum recrystallized via β-hemihydrate gypsum. In either case, what is particularly important in the modification method of the present invention for raw gypsum is that, although the natural gypsum or by-product gypsum to be modified and the crystals after the modification are both dihydrate gypsum, the natural gypsum or by-product gypsum is once converted into hemihydrate gypsum as an intermediate between the natural gypsum or by-product gypsum and the crystals. Specifically, dihydrate gypsum such as natural gypsum or by-product gypsum can be converted into modified dihydrate gypsum which is composed of crystals of greater than 60 μm, especially 64 μm or greater in average particle size, is free of darkness, is uniform in particle size and has a high purity, if the dihydrate gypsum is once converted surely into hemihydrate gypsum and the hemihydrate gypsum is then recrystallized into dihydrate gypsum in accordance with the conditions specified in the present invention. In the present invention, it is only necessary to convert raw gypsum into hemihydrate gypsum by such a method as described above. The hemihydrate gypsum in this stage may preferably be one containing combined water at 8% or less. If the combined water is contained more than this level, the raw gypsum remains as it is, so that impurities as a cause of darkness or dark stains increase, and in addition, the average particle size of modified dihydrate gypsum to be obtained through recrystallization also tends to become smaller.

[Recrystallization Step and Discharge Step]

(Stirring)

In the modification process of the present invention for dihydrate gypsum, dihydrate gypsum such as natural gypsum or by-product gypsum is surely converted into hemihydrate gypsum by such a method as described above, and the hemihydrate gypsum is recrystallized into modified dihydrate gypsum under conditions to be described subsequently herein. Described specifically, the hemihydrate gypsum or hemihydrate gypsum slurry obtained as described above is first introduced into a recrystallization reaction tank to conduct recrystallization, and while conducting stirring such that the slurry is made uniform to avoid separation of a solid component and a liquid component from each other, the slurry is maintained at a constant temperature to convert the hemihydrate gypsum into modified dihydrate gypsum. The stirring may be conducted by any method insofar as the slurry in the recrystallization reaction tank can be made as uniform as possible. Specifically, a method that uses, for example, stirring blades can be mentioned, although the stirring method varies depending on the concentration of hemihydrate gypsum. When the slurry is made uniform as described above, no variations arise in the residence time of the slurry, and therefore, the hemihydrate gypsum can be converted into modified dihydrate gypsum which is more uniform in particle size. Although the hydration reaction from hemihydrate gypsum into dihydrate gypsum is also conducted while stirring a gypsum slurry in Patent Document 4 referred to in the above, the stirring has to be conducted slowly because the resulting dihydrate gypsum of increased particle size is discharged from a lower part of a crystallizer. Different from the present invention, the stirring is, therefore, not conducted in such a way as making the slurry uniform.

(Slurry Concentration)

The concentration (solid concentration) of the slurry, which contains hemihydrate gypsum and is used in the recrystallization step of the modification process of the present invention for dihydrate gypsum, may be set at from 10 to 50 wt %, preferably at from 25 to 40 wt % on a weight basis. An excessively high slurry concentration is not preferred because the stirring to be conducted in the recrystallization step can hardly be conducted in a uniform state. On the other hand, an unduly low slurry concentration is not preferred either because no efficient and economical processing is feasible.

(Temperature)

In the present invention, hemihydrate gypsum is subjected to hydration and recrystallization in a slurry. Upon conducting the hydration and recrystallization, it is preferred to control the slurry temperature at a temperature of higher than 80° C. but not higher than 90° C. If recrystallization is continued for a longtime at a temperature of 80° C. or lower, the average particle size of the resulting modified dihydrate gypsum does not remain stable but varies, thereby making it difficult to stably obtain modified dihydrate gypsum with uniform particle size. Such a low temperature is hence not preferred. It is to be noted that large modified dihydrate gypsum having an average particle size of greater than 60 µm can still be obtained even at a solution temperature of 70° C. or so. It is, however, difficult to stably obtain such modified dihydrate gypsum with a similar uniform particle size as described above. Such a low temperature is hence not preferred. At a temperature lower than 70° C., recrystallization can still be conducted with ease, but it is difficult to stably convert hemihydrate gypsum into large modified dihydrate gypsum having an average particle size of 60 µm or greater, and the resulting modified dihydrate gypsum tends to take the form of crystals of small particle size. In this case, it is also difficult to stably obtain the modified dihydrate gypsum as dense crystals having a large bulk specific density. If the solution temperature is set higher than 90° C., on the other hand, the time required for the recrystallization tends to become significantly longer. Accordingly, hemihydrate gypsum can hardly be converted in its entirety into modified dihydrate gypsum in a predetermined time, lots of the hemihydrate gypsum remain in the form of hemihydrate gypsum, and therefore, the modification cannot be conducted well economically. Such an excessively high temperature is hence not preferred either.

(Feeding of Hemihydrate Gypsum and Discharging of Dihydrate Gypsum)

In the present invention, it is required to continuously or intermittently conduct the feeding of hemihydrate gypsum to the recrystallization reaction tank and the discharging of recrystallized and modified dihydrate gypsum from the recrystallization reaction tank in the recrystallization step while performing control such that the feed rate (charge rate) of hemihydrate gypsum and the discharge rate of recrystallized dihydrate gypsum become substantially equal to each other. Because, if the feed rate of hemihydrate gypsum is greater than the discharge rate of recrystallized and modified dihydrate gypsum, the slurry overflows from the recrystallization reaction tank so that additional facilities are needed to reutilize or treat the slurry. If the feed rate of hemihydrate gypsum is smaller than the discharge rate of recrystallized and modified dihydrate gypsum, the recrystallization reaction tank eventually becomes empty, thereby making it difficult to continuously conduct the modification. Although no particular limitation is imposed on the above-described control method, there is, for example, a method that measures the concentration of a slurry which contains modified dihydrate gypsum and is to be discharge, calculates the weight of modified dihydrate gypsum from the weight of the discharged slurry, and charges hemihydrate gypsum in an amount equivalent to the weight of the discharge modified dihydrate gypsum.

In the control of the feed rate of hemihydrate gypsum and the discharge rate of recrystallized and modified dihydrate gypsum, the feed rate and discharge rate per hour may be controlled preferably such that they are each controlled at 20% or smaller of the total amount of gypsum in the recrystallization reaction tank. No particular limitation is imposed on the control method of the feed rate and discharge rate. For example, there is a method that performs the control by continuously measuring the amount of the slurry based on the level of the slurry in the recrystallization reaction tank or the total weight of the recrystallization reaction tank, while controlling the concentration of the slurry in the tank. The latter is more preferred because more precise control can be performed. By performing the control as described above, raw gypsum can be more stably modified into modified dihydrate gypsum of excellent characteristics by a continuous treatment.

In the recrystallization step of the modification process of the present invention for dihydrate gypsum, the hemihydrate gypsum slurry is maintained at constant temperature while stirring the slurry to make it uniform such that it undergoes no solid-liquid separation. Upon conducting the recrystallization, it is preferred to control such that the gypsum is allowed to reside for 5 hours or longer in the recrystallization reaction tank. Such a residence time can be realized by controlling, at 20% or smaller per hour, the feed rate of hemihydrate gypsum and the discharge rate of dihydrate gypsum as specified in the present invention. According to a still further study by the present inventors, in order to convert hemihydrate gypsum in its entirety into dihydrate gypsum after completion of the recrystallization step, it is particularly effective to allow a slurry of the hemihydrate slurry to reside for 5 hours or longer under such conditions that the slurry is maintained at a temperature of higher than 80° C. but not higher than 90° C. as mentioned above. According to a still further study by the present inventors, hemihydrate gypsum can be stably and efficiently modified if the residence time is set at 5 hours or longer, more specifically in a range of from 5 to 10 hours (at from 10 to 20% in terms of discharge rate per hour), although the residence time varies depending on the kind and particle size of the gypsum material, the liquid temperature, the amount of dihydrate gypsum to be added as seed crystals, and the like. A longer residence time is good for recrystallization, but an excessively long residence time leads to lowered productivity and larger facilities, and therefore, is uneconomical.

(Modification Method)

In the present invention, the method that recrystallizes hemihydrate gypsum, which has been obtained by subjecting raw gypsum to dry calcination or wet calcination, into modified dihydrate gypsum can be either continuous or batchwise. However, batchwise recrystallization involves a problem in that the procedure is irksome, the particle size of recrystallized dihydrate gypsum is not stable from one batch to another, dihydrate gypsum can hardly be obtained stably as large crystals, and the productivity is inferior. According to the continuous modification process of the present invention for dihydrate gypsum, the step of recrystallizing hemihydrate gypsum into dihydrate gypsum is continuously performed so that continuous modification can be carried out more easily in a stable state. The continuous recrystallization, which is carried out in the present invention, may preferably be conducted by a multistage tank method that conducts the recrystallization reaction stepwise. It is to be noted that the term "batchwise recrystallization" as used herein means a method that divides the treatment for each recrystallization reaction, discharges the dihydrate gypsum slurry in an amount of 50% or more from the reaction tank upon completion of each recrystallization reaction, and then charging the hemihydrate slurry to be subjected to the next recrystallization reaction. On the other hand, the term. "continuous recrystallization" means a method that performs the feeding of hemihydrate gypsum and the discharging of recrystallized dihydrate gypsum constantly without interruptions or performs the feeding and the discharging intermittently. In the present invention, the feed rate of hemihydrate gypsum and the discharge rate of dihydrate gypsum are controlled substantially equal to each other as mentioned above. In this case, more preferred is such a method that the feed rate of hemihydrate gypsum and the discharge rate of dihydrate gypsum per hour are each 20% or smaller of the total amount of gypsum in all reaction tanks, in other words, more preferred is to control such that the residence time of gypsum in the recrystallization reaction tank becomes 5 hours or longer. According to such control, existing dihydrate gypsum such as natural gypsum, by-product gypsum or waste gypsum can be stably and efficiently modified into dihydrate gypsum, which is large in particle size, high in purity and uniform in particle size and is in a different crystalline form, by a continuous treatment.

Figure 2:
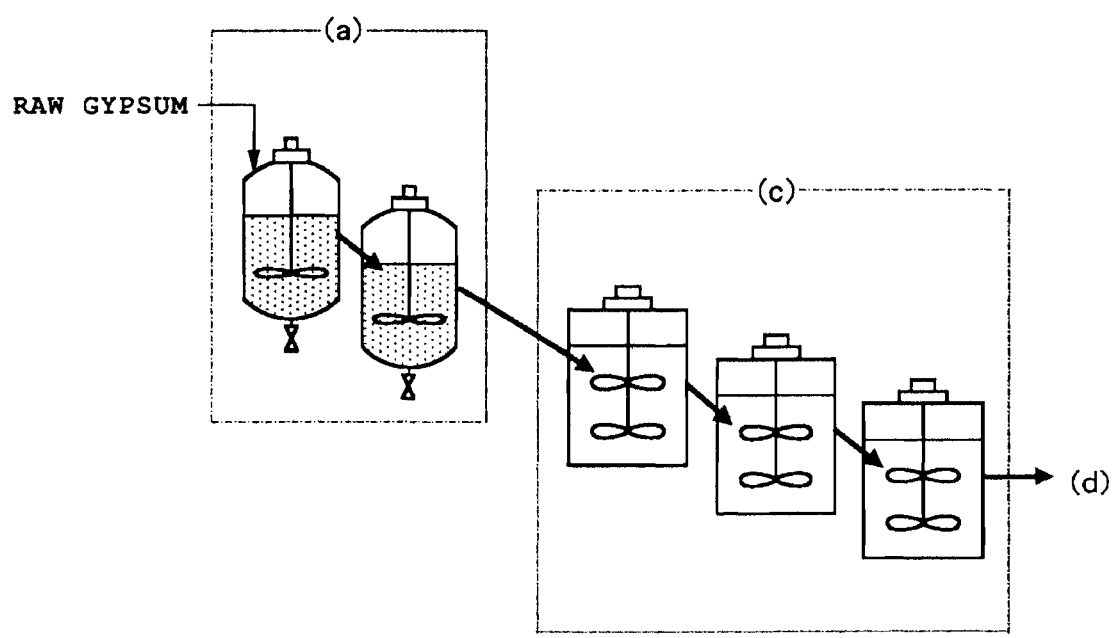
FIG. 2 is a schematic illustration for describing one example of equipment for use in the continuous modification process of the present invention for dihydrate gypsum.

The reaction tank for use in the recrystallization step may be in the form of a single tank, or may be in the form of two or more tanks connected together either in series or in parallel to conduct the treatment in multiple stages (see FIG. 2). By conducting the treatment as described above, substantially entire hemihydrate gypsum can be more easily converted into modified dihydrate gypsum, and further, the modified dihydrate gypsum can be obtained with high purity. The use of such plural tanks is, therefore, preferred. When subjecting hemihydrate gypsum to recrystallization through plural reaction tanks, it is necessary to perform control such that the total residence time through the individual tanks falls within the above-described range. According to a still further study by the present inventors, by setting the temperatures of the second and further tanks, which are connected in series, lower than that of the first tank, the overall residence time can be reduced. In this case, the liquid temperature of at least the first tank may preferably be controlled at a temperature of higher than 80° C. but not higher than 90° C.

(Discharging Method)

In the present invention, no particular limitation is imposed on the discharging method of modified dihydrate gypsum because it is required to conduct recrystallization under stirring such that the hemihydrate gypsum slurry in the recrystallization reaction tank is made uniform. The discharging method can be, for example, either a method that causes the slurry to overflow or a method that discharges the slurry from a desired location of the recrystallization tank while controlling the level or weight of the slurry in the recrystallization tank.

(Seed Crystals)

It is also preferred in the present invention to continuously or intermittently add dihydrate gypsum as seed crystals in a small amount to the recrystallization reaction tank. As a specific amount to be added, it is preferred to add seed crystals in a range of not smaller than 0.01 wt % but smaller than 5 wt %, more preferably in a range of from 0.05 to 2.0 wt % based on the hemihydrate gypsum to be fed. In this manner, the above-described excellent dihydrate gypsum can be obtained more stably. The addition of seed crystals is not essential in the present invention, but according to an even still further study by the present inventors, the particle size of modified dihydrate gypsum tends to become non-uniform when seed crystals are not added, and the particle size of modified dihydrate gypsum tends to become smaller when seed crystals are added in an excess amount. To obtain a product of higher quality, the addition of seed crystals in a small amount is preferred accordingly.

According to an even still further study by the present inventors, seed crystals to be added to the recrystallization reaction tank may be preferably 40 µm or smaller, more preferably 30 µm or smaller in average particle size because their particle size governs the average particle size of modified dihydrate gypsum to be obtained by the recrystallization. When seed crystals of such a size is added, the seed crystals can stably bring about its effect by their addition in a small amount in the above-described range, and in the recrystallization step, can obtain modified dihydrate gypsum of stable average particle size. If the particle size of seed crystals is excessively large, on the other hand, their effect as seed crystals is reduced even when added. Therefore, such an excessively large particle size is not preferred.

When dihydrate gypsum of such small particle size that the average particle size is, for example, 30 µm or smaller is used as raw gypsum to be modified in the present invention, the dihydrate gypsum to be modified can also be used as such seed crystals. If raw gypsum is not suitable as seed crystals, however, it is possible to use initial dihydrate gypsum of small particle size obtainable from the recrystallization of a hemihydrate gypsum slurry after the raw gypsum is once calcined to prepare the hemihydrate gypsum slurry in the hemihydration step as described above. For example, a portion of the above-described hemihydrate gypsum slurry obtained in the hemihydration step as described above may be introduced into a reaction tank in a system different from the reaction tank in which recrystallization is conducted, and a slurry of dihydrate gypsum of small particle size obtained by conducting crystallization at a temperature of 70° C. or lower in the reaction tank may be added to hemihydrate gypsum to be fed to the recrystallization reaction tank such that the slurry of dihydrate gypsum of small particle size is contained in the range of not smaller than 0.01 wt % but smaller than 5.0 wt % in terms of gypsum.

MORE PREFERRED EMBODIMENTS

As more preferred embodiments, the present invention may be constituted as will be described below in addition to the foregoing.

In the modification process of the present invention for dihydrate gypsum, it is more preferred to additionally include a step of separating modified dihydrate gypsum, which is low in insoluble impurities and is large in particle size, after the dihydrate gypsum slurry recrystallized and modified in the recrystallization step is discharged from the recrystallization reaction tank, and to conduct a method that stirs the modified dihydrate gypsum in water, leaves the resultant suspension standstill, and separates large crystals of high sedimentation rate. It is also preferred to further include a dewatering and washing step of dewatering and washing, into a final product, the modified dihydrate gypsum separated as described above (see FIG. 1). When constituted as described above, it is possible to more stably obtain modified dihydrate gypsum which is low in insoluble impurities, does not contain much darkness, has a large particle size of greater than 60 µm, especially 64 µm or greater, said large particle size having been not common conventionally, and is uniform in particle size. A description will be made subsequently herein about a specific separation method. It is to be noted that this separation method can be also used, independently from the modification technology of the present invention for dihydrate gypsum, as a technology for obtaining white gypsum from raw gypsum such as natural gypsum, one of various by-product gypsums, or waste gypsum.

In the present invention, dihydrate gypsum—as a raw material such as natural gypsum, one of various by-product gypsums, or waste gypsum—is transformed into hemihydrate gypsum. Upon conducting the transformation, it is possible to use, as mentioned above, the method that conducts dry calcination to obtain β-hemihydrate gypsum, or a pressurized calcination method such as the pressurized aqueous-solution method that obtains α-hemihydrate gypsum by conducting the transformation through the catalytic reaction with vaporized water or liquid water. When hemihydrate gypsum is obtained by the pressurized aqueous-solution method out of the above-mentioned methods, the hemihydrate gypsum is obtained as a slurry that contains the hemihydrate gypsum. A continuous treatment can, therefore, be conducted by introducing the hemihydrate gypsum slurry, as it is, into the recrystallization reaction tank and then conducting recrystallization under the conditions specified in the pre sent invention. When β-hemihydrate gypsum is obtained by conducting dry calcination, on the other hand, the hemihydrate gypsum can be converted into modified dihydrate gypsum by quantitatively introducing the hemihydrate gypsum directly into the recrystallization tank, adding a predetermined amount of warm water at the same time to form the hemihydrate gypsum into a slurry, and then conducting recrystallization under the conditions specified in the present invention.

(Crystal Shape Control Agent)

In the modification process of the present invention for dihydrate gypsum, it is preferred, in each of the above-described embodiments, to bring the slurry in the hemihydration reaction tank and/or recrystallization reaction tank (in the pressurized calcination method) into a state that a carboxylic acid or a salt thereof selected from gluconic acid, succinic acid, maleic acid, tartaric acid, malic acid, acrylic acid or a polycarboxylic acid, or a salt thereof is contained as described above. The amount to be added may be set in a range of preferably from 0.1 to 2.0 wt %, more preferably from 0.1 to 1.0 wt %, still more preferably from 0.1 to 0.7 wt % based on the hemihydrate gypsum. According to a yet further study by the present inventors, such a carboxylic acid or a salt thereof is considered to function as a crystal shape control agent. If such a carboxylic acid or a salt thereof is not added, one having a desired average particle size may not be stably obtained in some instances, especially when a modification operation is conducted continuously. As to its amount to be added, an unduly small amount involves a problem in that the resulting modified dihydrate gypsum has a large aspect ratio, while an excessively large amount is accompanied by problems in that the recrystallization becomes slow, the running cost required for the control agent increases, and therefore, the modification process is not economical. As a specific manner of addition of the crystal shape control agent, such a carboxylic acid or a salt thereof can be added in a range of from 0.1 to 2.0 parts by weight per 100 parts by weight of raw gypsum to a pressurized calciner or the raw gypsum slurry before the pressurized calcination when the raw gypsum is subjected to pressurized calcination to obtain hemihydrate gypsum. Such a carboxylic acid or a salt can be added directly to the slurry in the recrystallization reaction tank when raw gypsum is subjected to dry β-calcination to obtain hemihydrate gypsum.

According to a still yet further study by the present inventors, it is particularly preferred to add sodium succinate in a range of from 0.1 to 1.0 wt %, with from 0.1 to 0.7 wt % being more preferred, based on the gypsum in the recrystallization step. In the hemihydration step, sodium succinate may preferably be added as a crystal habit modifier in a range of from 0.1 to 1.0 wt % in a stage that dihydrate gypsum, which is contained in a gypsum material, is transformed into α-hemihydrate gypsum through the catalytic reaction with vaporized water or liquid water. Because, when the transformation is conducted as described above, the transformation into α-hemihydrate gypsum can be conducted fully, and moreover, by continuously treating the resulting α-hemihydrate gypsum slurry, as it is, in the recrystallization step, the hemihydrate gypsum is converted into modified dihydrate gypsum in the form of large crystals of 64 μm or greater in average particle size.

According to a still yet further study by the present inventors, sodium succinate and another compound of the polycarboxylic acid type may be used in combination in a range of from 0.05 to 0.2 wt % and in a range of from 0.01 to 0.1 wt %, respectively, based on the gypsum as crystal shape control agents for inducing recrystallization in the solution. In the foregoing, it is more preferred to use sodium succinate and the another compound of the polycarboxylic acid type in combination at from 0.07 to 0.15 wt % and from 0.01 to 0.08 wt %, respectively. When the above-described crystal shape control agent is added in the pressurized calcination step at the stage that the dihydrate gypsum contained in the gypsum material is transformed into α-hemihydrate gypsum through the catalytic reaction with vaporized water or liquid water, the transformation into α-hemihydrate gypsum is fully conducted, and moreover, by continuously treating the resulting α-hemihydrate gypsum slurry as it is in the recrystallization step, the hemihydrate gypsum can be converted into modified dihydrate gypsum in the form of large crystals of 64 μm or greater in average particle size. As to their amount to be added, an unduly small amount provides the resulting modified dihydrate gypsum with a large aspect ratio and is not preferred, while an excessively large amount leads to slow recrystallization and increased running cost for the control agents, and therefore, to diseconomy.

(pH)

The pH of the hemihydrate gypsum slurry to be introduced into the reaction tank for its recrystallization treatment may be set preferably at 7.0±2.0, more preferably at 7.0±1.5. As one of physical properties required for gypsum products, there is pH. Gypsum products of around neutral pH are desired in many instances. Upon transforming into α-hemihydrate gypsum by using a carboxyl-containing compound as a crystal habit modifier, however, its effect as the crystal habit modifier can be readily brought about if the pH of the solution is adjusted to the alkaline side. When the quality of a product is taken into consideration, it is, therefore, preferred to adjust the pH of the hemihydrate gypsum slurry into such a range as described above so that the resulting modified gypsum material is provided with a pH around neutral.

(Surfactant and/or Defoaming Agent)

In the recrystallization step of the modification process of the present invention for dihydrate gypsum, one or more surfactants and/or defoaming agents may be incorporated in a range of from 0.01 to 0.2 wt % in total in the recrystallization reaction tank. Usable surfactants include alkylbenzene-sulfonate-based surfactants, alkyl-sulfate-based surfactants, alkyl-ether-sulfate-based surfactants, ligninsulfonate-based surfactants, naphthalene-sulfonate-based surfactants, bisphenol-based surfactants, and polycarboxylate-based surfactants. On the other hand, defoaming agents which can be used likewise include polyether-based defoaming agents, fatty-acid-based defoaming agents, mineral-oil-based defoaming agents, silicone-based defoaming agents and emulsion-based defoaming agents. The addition of such a surfactant or defoaming agent makes it possible to suitably separate out darkness components, which are such impurities as causing darkness or dark stains, upon collecting dihydrate gypsum after completion of the recrystallization. According to a still yet further study by the present inventors, alkylbenzene-sulfonate-based surfactants and polycarboxylate-based surfactants are also effective as crystal shape control agents, and therefore, the combined use of such a surfactant has an advantage in that the amount of the above-described crystal shape control agent to be additionally incorporated can be reduced.

[Separation Step as a Technology for Obtaining White Gypsum]

As described above, the modification process of the present invention for dihydrate gypsum may preferably be provided with an additional step to separate recrystallized dihydrate gypsum after such a recrystallization step as described above, and further to conduct a treatment as will be described below for further enhancing its value as a material for gypsum products. As already mentioned above, this separation method can also be used, as a technology for obtaining white gypsum, independently from the modification technology of the present invention for dihydrate gypsum. A description will hereinafter be made about this separation method. After completion of the recrystallization step, darkness components can be eliminated from the slurry, which contains modified dihydrate gypsum, by such an elutriation method as will be described below. By recrystallizing hemihydrate gypsum in the recrystallization step, the soluble or insoluble impurities contained in the raw gypsum are separated from modified dihydrate gypsum, and are in a state where they are mixed in the slurry. The insoluble impurities contained in the raw gypsum are 30 µm or smaller in average particle size and are very fine in many instances. They are, therefore, low in sedimentation rate in comparison with modified dihydrate gypsum. Accordingly, the use of the elutriation method makes it possible to separate such insoluble impurities in a convenient form from the slurry. By repeatedly conducting the elutriation method, modified dihydrate gypsum of still higher purity can be obtained. There is a method that conducts separation by using a hydraulic cyclone. According to an even yet still further study by the present inventors, this method is not suited as a method for separating only insoluble impurities from a gypsum slurry in a state where modified dihydrate gypsum and the insoluble impurities are mixed. According to the elutriation method, on the other hand, these impurities can be separated and eliminated by discharging supernatant water while making use of a difference in sedimentation rate that crystals of modified dihydrate gypsum, said crystals being large in average particle size, are higher in sedimentation rate than the insoluble impurities. As a part of crystals of modified dihydrate gypsum, said crystals being small in average particle size, is also separated to the side of impurities at the same time in this case, the thus-obtained modified dihydrate gypsum can be provided with a still greater average particle size. It is also possible to design such that the supernatant water, which has been separated and discharged, is returned and reused as water for the hemihydration step and/or recrystallization step (see FIG. 1). When designed so, the modification treatment is conducted again so that the modified dihydrate gypsum of small average particle size is modified into modified dihydrate gypsum having a desired particle size suited as a material for a gypsum product. Further, the crystals of modified dihydrate gypsum, which remain after discharging the supernatant water and are large in average particle size, can be converted into a gypsum material composed of modified dihydrate gypsum of the desired particle size suited as a material for the gypsum product by adding water again to the crystals to form a slurry and then processing the slurry by a known method such as a centrifugator or filter press to separate water. Further, soluble impurities can be eliminated by washing the slurry with clean water before or during dewatering upon separating water as described above (dewatering and washing step).

According to an even yet still further study by the present inventors, darkness components confined within crystals can be eliminated by calcining natural gypsum, one of various by-product gypsums, waste gypsum or the like into hemihydrate gypsum, and similar to the present invention, placing the hemihydrate gypsum in water, and recrystallizing the same. Described more specifically, the hemihydrate gypsum is formed into a slurry in the presence of a surfactant and/or defoaming agent added to facilitate the separation of darkness components, and upon recrystallization of the hemihydrate gypsum, the darkness components adhered on the hemihydrate gypsum and the darkness components confined within the crystals of the hemihydrate gypsum are caused to separate. No particular limitation is imposed on the slurry temperature at this time, insofar as the hydration reaction is allowed to proceed. When the above-described separation method is carried out subsequently, these darkness components can be eliminated. As the surfactant and/or defoaming agent used upon conducting the recrystallization, it is preferred to incorporate one or more of such surfactants and/or defoaming agents as exemplified above in a range of from 0.01 to 0.2 wt % in total. When the separation is conducted as described above, good white gypsum can be obtained, for example, with a brightness of 80 or higher as measured by a colorimeter and expressed in terms of Hunter's brightness. When natural gypsum, one of various by-product gypsums or waste gypsum is used as a raw material, a product of high brightness cannot be readily obtained by any conventional method, and therefore, its applications have been limited. As the use of the above-described method can realize an expansion in applications, the above-described method also has significant benefits from the standpoints of recycling and environmental conservation.

(Continuous System)

According to the modification process of the present invention for dihydrate gypsum, dihydrate gypsum in a raw gypsum such as natural gypsum or by-product gypsum is surely converted into hemihydrate gypsum in the hemihydration step, and in the subsequent recrystallization step, the hemihydrate gypsum is hydrated and recrystallized into modified dihydrate gypsum of large average particle size, and the modified dihydrate gypsum is then collected to provide it as a gypsum material suitable for gypsum products. This series of steps can be continuously conducted. An outline of an illustrative continuous system is shown in FIGS. 1 and 2. In the illustrative system, two reaction tanks are used for the hemihydration step, and three reaction tanks are employed for the recrystallization step. Using these reaction tanks and following such a procedure as illustrated in FIG. 1, raw gypsum which has been once converted into hemihydrate gypsum is hydrated and recrystallized in its entirety into modified dihydrate gypsum, the modified dihydrate gypsum is introduced into a separation tank, and by such an elutriation method as described above, modified dihydrate gypsum of large particle size is separated. As illustrated in FIG. 1, supernatant water is circulated and used, for example, as slurry-forming water for dissolving the dihydrate gypsum as the raw material or as slurry-forming water upon recrystallization of dry-calcined hemihydrate gypsum. In a preferred embodiment of the present invention, the temperature of the slurry is set higher than 80° C. upon conducting recrystallization in the recrystallization step, and therefore, substantial heat energy is required. It is preferred to re-collect and use warm water as described above, because the re-collecting and use of such warm water contributes to energy saving in such a system as a whole. Moreover, the crystal habit modifier needed for the transformation into α-hemihydrate gypsum, the carboxylic acid or its salt needed upon recrystallization and the like are contained in the supernatant water. If the supernatant water is re-collected and used as slurry-forming water, it is possible to reduce the amounts of these agents to be used. Accordingly, the re-collecting and use of such supernatant water can reduce the running cost and is economical. If such supernatant water is repeatedly used as described above, it is also possible to avoid water contamination which would otherwise occur by discharged water. Such repeated use of supernatant water is, therefore, also beneficial from the aspect of environmental protection. When supernatant water is used, it is desired to design such that the concentrations of such agents as mentioned above in the supernatant water are analyzed by predetermined methods and they are added as much as needed. It is also possible to design such that the re-collected supernatant water is caused to flow through a known settling tank, thickener, filter machine and the like to separate insoluble impurities (see FIG. 1).

(Characteristics of Modified Dihydrate Gypsum)

Figure 5:
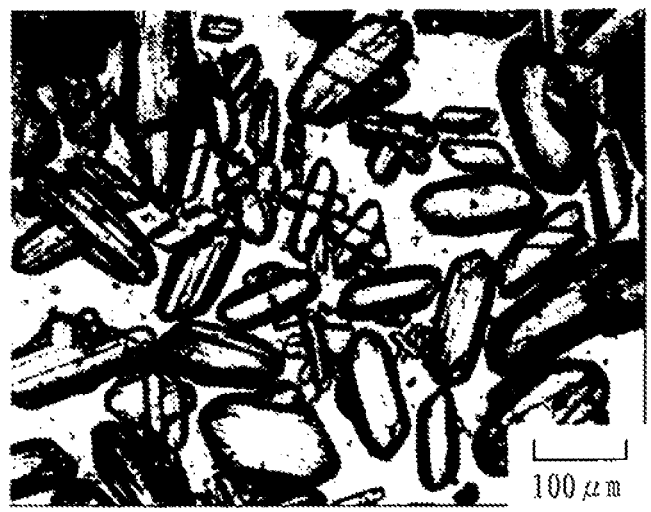
FIG. 5 is a micrograph of dihydrate gypsum modified in Example 4.

The modification process of the present invention for dihydrate gypsum is particularly useful especially as a process for easily converting raw gypsum into crystallized and modified dihydrate gypsum having an average particle size of 64 μm or greater and an untamped density of 0.8 or higher. According to the modification process of the present invention for dihydrate gypsum, modified dihydrate gypsum in the form of crystals, which have an aspect ratio of 5 or smaller and are uniform in particle size as shown in FIG. 5, can be obtained with ease. According to an even yet still further study by the present inventors, when no control is made or control is not performed well in the recrystallization of hemihydrate gypsum, modified dihydrate gypsum available from the recrystallization has an aspect ratio greater than 5, and extremely needle crystals are formed. When formed into needle crystals, the gypsum material is provided with a reduced bulk density. When a calcined gypsum product is manufactured by calcining such a gypsum material, inconveniences arise such as a significant increase in the amount of water to be mixed, and therefore, such a gypsum material is not considered to be a good gypsum material. The term "aspect ratio of modified dihydrate gypsum" as used herein means a value obtained by dividing the major axis of a crystal with its minor axis. If the average particle size is 60 μm or greater like the modified dihydrate gypsum according to the present invention, the crystals can be easily observed under an optical microscope of approximately ×100 magnification (see FIG. 5). In the modification process of the present invention for dihydrate gypsum, the untamped density of modified dihydrate gypsum may be preferably 0.8 or higher, more preferably 0.9 or higher. Untamped density is also associated with aspect ratio. There are applications where high untapped bulk densities are required. The modification process of the present invention for dihydrate gypsum is useful especially as a process for converting dihydrate gypsum as a raw material into crystallized and modified dihydrate gypsum having an average particle size of 64 μm or greater and an untamped density of 0.9 or higher. When the value of the untamped density of modified dihydrate gypsum is large, the dihydrate gypsum can be reduced in volume, and therefore, has an industrial merit when it is transported or stored. It is to be noted that the term "untamped density of dihydrate gypsum crystals" means the weight when the dihydrate gypsum is filled in a dry form in a container of specified volume without tapping, and may also be called "untamped apparent density", "untamped bulk specific gravity" or "untamped unit volume mass (weight)". It is also to be noted that depending on the application, the modified dihydrate gypsum obtained by the present invention can be recrystallized in the recrystallization step without dewatering and washing, and after the recrystallization, the slurry discharged from the recrystallization reaction tank can be provided as a gypsum product.

EXAMPLES

The present invention will hereinafter be described more specifically based on examples, although the present invention shall not be limited to these examples. It is to be noted that the designations of "parts" or "%" in the following description are on a weight basis unless otherwise specifically indicated. The average particle size of each gypsum was measured by "MICROTRACK MK-II PARTICLE SIZE ANALYZER". As the aspect ratio of crystals, the crystals were photographed under an optical microscope of ×100 magnification, the minor axes and major axes of principal crystals were measured, and an average aspect ratio was determined. As the purity of gypsum, a sample was dried at 40° C., combined water was measured by an electronic moisture meter, and based on the theoretical value, its percentage was calculated to determine the purity. To test the degree of progress of recrystallization, a sample was dried at 40° C. and then subjected to X-ray diffraction, and from the intensity of a peak of dihydrate gypsum and that of a peak of hemihydrate gypsum, the degree of progress of recrystallization was determined. The brightness of each gypsum was measured by a colorimeter, and the result was indicated in terms of Hunter's brightness.

Example 1

Provided as a raw material to be modified was natural gypsum, which had been ground to an average particle size of 28 μm and had a brightness of 71 and a purity of 95.5%. The raw material was first subjected to dry calcination over 2 hours or so in a dryer controlled at 150° C., whereby the raw material was converted into β-hemihydrate gypsum containing 5.2% of combined water. The hemihydrate gypsum (800 g) obtained as described above and a 0.5% solution (1,800 g) of sodium gluconate, said solution having been heated to 80.3° C., were next combined and stirred in a 3-L reaction tank equipped with a stirrer and heater such that a uniform slurry was formed. A fresh supply (20 g) of the natural gypsum, which was the same as the raw material to be modified and had been ground to the average particle size of 28 µm, was added further. While maintaining the slurry at 80.3° C., stirring was continued for 24 hours under similar conditions as described above. As a result, it was confirmed that the gypsum in the slurry had been recrystallized in its entirety into dihydrate gypsum. Subsequently, a fresh supply (160 g/hr) of the same hemihydrate gypsum, a fresh supply (360 g/hr) of the same 0.5% aqueous solution of sodium gluconate, said solution having been heated to 80.3° C., and a fresh supply (4 g/hr) of the same natural gypsum as the raw material to be modified, said natural gypsum having been ground to the average particle size of 28 µm, were continuously added for 24 hours to conduct recrystallization treatment. The slurry in the reaction tank was discharged such that the residence time of gypsum became about 5.9 hours [the percentage of the discharged amount per hour based on the total amount of slurry in the tank (hereinafter called "the discharge rate"): 16.9%] as determined by calculation. From the slurry so discharged, solid matter of high sedimentation rate was separated by the elutriation method, and the separated solid matter was dried at 40° C.

The resultant dry product was analyzed by X-ray diffraction. As a result, it was confirmed that the dry product was composed of dihydrate gypsum in its entirety, and from combined water, it was also confirmed that its purity was 97.5% and had been extremely increased. The brightness was 71. Its average particle size was also measured. As a result, it was found that the product had been modified to a large particle size of 86 µm as opposed to 28 µm before the treatment. In addition, the untapped bulk specific density was 0.9.

Example 2

Provided as a raw material to be modified was flue gas desulfurization gypsum, which had an average particle size of 32 µm and a purity of 98.5%. The raw material was first subjected to dry calcination over 2 hours or so in a dryer controlled at 150° C., whereby the raw material was converted into β-hemihydrate gypsum containing 6.3% of combined water. The resulting hemihydrate gypsum (800 g) and a 0.5% solution (2,000 g) of maleic acid, said solution having been heated to 83.0° C., were next mixed in a 3-L reaction tank equipped with a stirrer and heater such that a uniform slurry was formed. A fresh supply (10 g) of the flue gas desulfurization gypsum, which was the same as the raw material to be modified and had the average particle size of 32 µm, was added further. While maintaining the slurry at 83.0° C., stirring was continued for 24 hours under similar conditions as described above. As a result, it was confirmed that the gypsum in the slurry had been recrystallized in its entirety into dihydrate gypsum. Subsequently, a fresh supply (160 g/hr) of the same hemihydrate gypsum, a fresh supply (400 g/hr) of the same 0.5% aqueous solution of maleic acid, said solution having been heated to 83.0° C., and a fresh supply (2 g/hr) of the same flue gas desulfurization gypsum as the raw material to be modified, said flue gas desulfurization gypsum having been ground to the average particle size of 32 µm, were continuously added for 24 hours to conduct recrystallization treatment. The slurry in the reaction tank was discharged such that the residence time of gypsum became about 5.4 hours (the discharge rate per hour: 18.5%) as determined by calculation. From the slurry so discharged, solid matter of high sedimentation rate was separated by the elutriation method, and the separated solid matter was dried at 40° C.

The resultant dry product was analyzed by X-ray diffraction. As a result, it was confirmed that the dry product was composed of dihydrate gypsum in its entirety, and from combined water, it was also confirmed that its purity had increased to 99.0%. Its average particle size was also measured. As a result, it was found that the product had been modified to an extremely large particle size of 133 µm as opposed to 32 µm before the treatment. In addition, the untapped bulk specific density was 1.1, and therefore, the product was dense.

Example 3

Provided as a raw material to be modified was phosphogypsum, which had an average particle size of 37 µm and a purity of 98.6%. The raw material was first subjected to dry calcination over 2 hours or so in a dryer controlled at 150° C., whereby the raw material was converted into β-hemihydrate gypsum containing 6.1% of combined water. The resulting hemihydrate gypsum (800 g) and a 0.5% solution (2,000 g) of succinic acid, said solution having been heated to 84.8° C., were mixed in a 3-L reaction tank equipped with a stirrer and heater such that a uniform slurry was formed. A fresh supply (20 g) of the phosphogypsum, which had the average particle size of 37 µm and was the same as the raw material to be modified, was added further. While maintaining the slurry at 84.8° C., stirring was continued for 24 hours under similar conditions as described above. As a result, it was confirmed that the gypsum in the slurry had been recrystallized in its entirety into dihydrate gypsum. Subsequently, a fresh supply (160 g/hr) of the same hemihydrate gypsum, a fresh supply (400 g/hr) of the same 0.5% aqueous solution of succinic acid, said solution having been heated to 84.8° C., and a fresh supply (4 g/hr) of the same phosphogypsum as the raw material to be modified, said phosphogypsum having been an average particle size of 37 µm, were continuously added for 24 hours to conduct recrystallization treatment. The slurry in the reaction tank was discharged such that the residence time of gypsum became about 5.4 hours (the discharge rate per hour: 18.5%) as determined by calculation. From the slurry so discharged, solid matter of high sedimentation rate was separated by the elutriation method, and the separated solid matter was dried at 40° C.

The resultant dry product was analyzed by X-ray diffraction. As a result, it was confirmed that the dry product was composed of dihydrate gypsum in its entirety, and from combined water, it was also confirmed that its purity had increased to 98.8%. Its average particle size was also measured. As a result, it was found that the product had been modified to a large particle size of 109 µm as opposed to 37 µm before the treatment. In addition, its untapped bulk specific density was also determined. As a result, it was found to be 1.0.

Example 4

Figure 3:
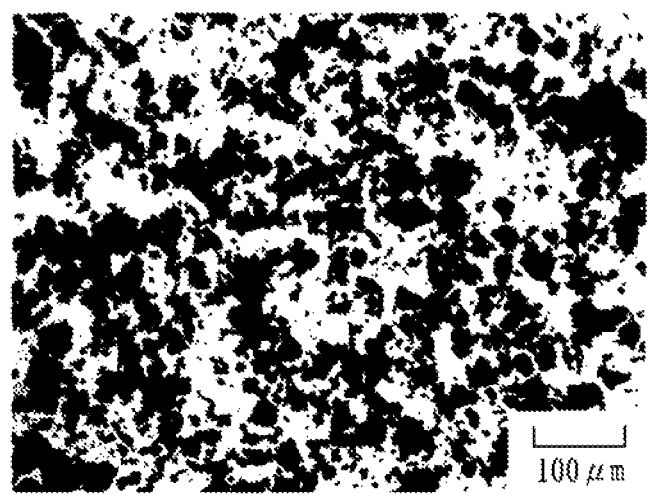
FIG. 3 is a micrograph of a raw material used for modification in Example 4.
Figure 4:
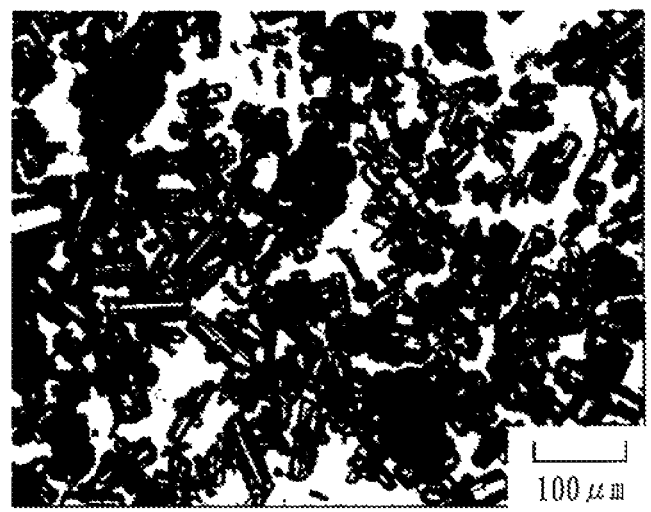
FIG. 4 is a micrograph of α-hemihydrate gypsum obtained after a calcination step in Example 4.

Provided as a raw material to be modified was neutralization gypsum, which had an average particle size of 22 µm, a brightness of 72 and a purity of 99.1%, and a continuous treatment was conducted as will be described below. An optical micrograph of the neutralization gypsum provided as the raw material in this example is shown in FIG. 3. No large crystals are observed. The raw material was first placed and mixed in a 0.5% solution of sodium succinate to prepare a slurry that contained the raw material at 35%. The slurry was next subjected to constant-rate feeding and constant-rate discharging to and from an autoclave, which was controlled at 130° C. under pressure, for 24 hours such that its residence time became 2 hours. After the treatment, the raw material discharged from the autoclave was analyzed. It was confirmed that the solid matter was α-hemihydrate gypsum containing 6.1% of combined water and also that such hemihydrate gypsum was continuously obtained. An optical micrograph of the α-hemihydrate gypsum obtained as described above is shown in FIG. 4. The pH of the slurry was 7.2

The α-hemihydrate gypsum slurry continuously obtained in the above-described step was next continuously fed at a constant rate to a reaction tank equipped with a heater and stirrer and controlled at 85.2° C., and in addition, a fresh supply of the neutralization gypsum as the raw material was continuously added such that the neutralization gypsum would amount to 0.6% based on the hemihydrate gypsum to be fed. While conducting stirring such that the slurry became uniform, recrystallization treatment was conducted by making control such that the residence time of the hemihydrate gypsum slurry so fed became 5.5 hours (discharge rate per hour: 18.2%). After the constant-rate feeding was continued for 24 hours as described above, solid matter of high sedimentation rate was separated by the elutriation method from the slurry discharged from the reaction tank.

The solid matter was dried at 40° C. The resultant dry product was analyzed by X-ray diffraction. As a result, it was confirmed that the dry product was composed of dihydrate gypsum in its entirety, and from combined water, it was also confirmed that its purity had increased to 99.2%. As a result of an observation of the dry product under an optical microscope, the dry product was found to be crystallized with uniform and large particle size as shown in FIG. 5. Its average particle size was also measured. As a result, it was found that the product had been modified to an extremely large particle size of 138 μm as opposed to 22 μm before the treatment. In addition, the untapped bulk specific density was also measured. As a result, the untapped bulk specific density was found to be 1.2 and therefore, the product was dense. Further, the aspect ratio was about 2, and the Hunter's brightness was 73.

Example 5

Provided as a raw material to be modified was neutralization gypsum having an average particle size of 23 μm, and in a similar manner as in Example 4, α-hemihydrate gypsum was obtained. The α-hemihydrate gypsum was then continuously fed at a constant rate to a reaction tank equipped with a heater and stirrer and controlled at 85.4° C., and in addition, a fresh supply of the same neutralization gypsum as the raw material was continuously added such that the neutralization gypsum would amount to 0.6% based on the hemihydrate gypsum to be fed. While conducting stirring such that the slurry became uniform, recrystallization treatment was conducted by making control such that the residence time of the hemihydrate gypsum slurry so fed became 8.0 hours (discharge rate per hour: 12.5%). After the constant-rate feeding was continued for 24 hours as described above, solid matter of high sedimentation rate was separated by the elutriation method from the slurry discharged from the reaction tank.

The solid matter was dried at 40° C. The resultant dry product was analyzed by X-ray diffraction. As a result, it was confirmed that the dry product was composed of dihydrate gypsum in its entirety, and from combined water, it was also confirmed that its purity was 99.6%. Its average particle size was also measured. As a result, it was found that the product had been modified to an extremely large particle size of 142 μm as opposed to 23 μm before the treatment. In addition, the untapped bulk specific density was also measured. As a result, the untapped bulk specific density was found to be 1.0 and therefore, the product was dense.

Example 6

Provided as a raw material to be modified was polyaluminum chloride by-product gypsum having a purity of 97.2% and an average particle size of 25 μm. To the raw material, a solution with sodium succinate and a polyalkylene-glycol-based polycarboxylate surfactant dissolved at 0.2% at 0.1%, respectively, therein was first added, followed by mixing to prepare a 35% slurry. A 0.4% solution of calcium hydroxide was next added to adjust the pH of the slurry to 9.5. The slurry was next subjected to constant-rate feeding and constant-rate discharging to and from an autoclave, which was controlled at 130° C., such that its residence time became 2 hours. After the treatment, the gypsum discharged from the autoclave was analyzed. It was confirmed that the gypsum was α-hemihydrate gypsum containing 6.2% of combined water and also that such hemihydrate gypsum was continuously obtained.

The α-hemihydrate gypsum slurry of pH 6.9 continuously obtained in the above-described step was next introduced into a reaction tank equipped with a heater and stirrer and controlled at 85.1° C., and in addition, a fresh supply of the same polyaluminum chloride by-product gypsum as the raw material to be modified was continuously fed at a constant rate such that the polyaluminum chloride by-product gypsum would amount to 0.6% in terms of the weight percentage of gypsum. While conducting stirring such that the slurry became uniform, recrystallization treatment was conducted by making control such that the residence time of the slurry became 6 hours. After the constant-rate feeding was continued for 24 hours as described above, solid matter was separated by the elutriation method from the slurry discharged from the reaction tank.

The solid matter was dried at 40° C. The resultant dry product was analyzed by X-ray diffraction. As a result, it was confirmed that the dry product was composed of dihydrate gypsum in its entirety, and from combined water, it was also confirmed that its purity extremely increased to 99.1%. Its average particle size was also measured. As a result, it was found that the product had been modified to an extremely large particle size of 132 μm as opposed to 25 μm before the treatment. In addition, the untapped bulk specific density was also measured. As a result, the untapped bulk specific density was found to be 1.2. The aspect ratio was about 3.

Example 7

Modification of neutralization gypsum having an average particle size of 22 μm was conducted in exactly the same manner and under exactly the same conditions as in Example 4 except that a naphthalene-sulfonate-based surfactant was added at 0.1% concentration to the slurry before the calcination. Similar to Example 4, after the constant-rate feeding was continued for 24 hours, solid matter of high sedimentation rate was separated by the elutriation method from the slurry discharged from the reaction tank.

The solid matter was dried at 40° C. The resultant dry product was analyzed by X-ray diffraction. As a result, it was confirmed that the dry product was composed of dihydrate gypsum in its entirety, and from combined water, it was also confirmed that its purity had increased to 99.2%. Its average particle size was also measured. As a result, it was found that the product had been modified to an extremely large particle size of 136 µm as opposed to 22 µm before the treatment. In addition, the untapped bulk specific density was also measured. As a result, the untapped bulk specific density was found to be 1.2. The aspect ratio was about 2, and the Hunter's brightness was 90. The product was a material suited especially as white gypsum.

Example 8

Modification of neutralization gypsum having an average particle size of 22 µm was conducted in exactly the same manner and under exactly the same conditions as in Example 4 except that a commercial polyether-based defoaming agent was added at 0.1% concentration to the slurry before the calcination. Similar to Example 4, after the constant-rate feeding was continued for 24 hours, solid matter of high sedimentation rate was separated by the elutriation method from the slurry discharged from the reaction tank.

The solid matter was dried at 40° C. The resultant dry product was analyzed by X-ray diffraction. As a result, it was confirmed that the dry product was composed of dihydrate gypsum in its entirety, and from combined water, it was also confirmed that its purity had increased to 99.3%. Its average particle size was also measured. As a result, it was found that the product had been modified to an extremely large particle size of 137 µm as opposed to 22 µm before the treatment. In addition, the untapped bulk specific density was also measured. As a result, the untapped bulk specific density was found to be 1.2. The aspect ratio was about 2, and the Hunter's brightness was 91. The product was a material suited especially as white gypsum.

Example 9

Modification of neutralization gypsum having an average particle size of 22 µm was conducted in exactly the same manner and under exactly the same conditions as in Example 4 except that the amount of the neutralization gypsum, which was the same as the raw material to be modified and was to be added as seed crystals upon recrystallization treatment, was changed to 2%. Similar to Example 4, after the constant-rate feeding was continued for 24 hours, solid matter of high sedimentation rate was separated by the elutriation method from the slurry discharged from the reaction tank. The separated solid matter was dried at 40° C. The resultant dry product was analyzed by X-ray diffraction. As a result, it was confirmed that the dry product was composed of dihydrate gypsum in its entirety, and from combined water, it was also confirmed that its purity had increased to 99.2%. Its average particle size was also measured. As a result, it was found that the product had been modified to a large particle size of 87 µm as opposed to 22 µm before the treatment although the particle size was smaller compared with those in the other examples. In addition, the untapped bulk specific density was 1.1, and the aspect ratio was about 2.

Example 10

Modification of neutralization gypsum having an average particle size of 22 µm was conducted in exactly the same manner and under exactly the same conditions as in Example 4 except that the amount of the neutralization gypsum, which was the same as the raw material to be modified and was to be added as seed crystals upon recrystallization treatment, was changed to 4.8%. Similar to Example 4, after the constant-rate feeding was continued for 24 hours, solid matter of high sedimentation rate was separated by the elutriation method from the slurry discharged from the reaction tank. The separated solid matter was dried at 40° C. The resultant dry product was analyzed by X-ray diffraction. As a result, it was confirmed that the dry product was composed of dihydrate gypsum in its entirety, and from combined water, it was also confirmed that its purity was 99.1%. Its average particle size was also measured. As a result, it was found that the average particle size was 64 µm as opposed to 22 µm before the treatment and that the product had been modified to one having the large particle size although the particle size was smaller compared with those of the other examples. The untapped bulk specific density was 1.0, and the aspect ratio was about 2.

Example 11

Modification of neutralization gypsum having an average particle size of 22 µm was conducted in exactly the same manner and under exactly the same conditions as in Example 4 except that the concentration of the solution of sodium succinate added upon preparation of the 35% slurry of the raw material was changed to 0.1%. Solid matter of high sedimentation rate was separated by the elutriation method, and the separated solid matter was dried at 40° C. The resultant dry product was analyzed by X-ray diffraction. As a result, it was confirmed that the dry product was composed of dihydrate gypsum in its entirety, and from combined water, it was also confirmed that its purity had increased to 99.2%. Its average particle size was also measured. As a result, it was found that the average particle size was 101 µm as opposed to 22 µm before the treatment and that the product had been modified to greater one. However, the untapped bulk specific density was as light as 0.7, while the aspect ratio was as large as about 7. The quality of the product as a gypsum material was, therefore, inferior to those obtained in other examples.

Referential Example 1

Modification of neutralization gypsum having an average particle size of 22 µm was conducted in exactly the same manner and under exactly the same conditions as in Example 4 except that the amount of the neutralization gypsum to be added as seed crystals upon recrystallization treatment was changed to 10%. Similar to Example 4, after the constant-rate feeding was continued for 24 hours, solid matter of high sedimentation rate was separated by the elutriation method from the slurry discharged from the reaction tank. The separated solid matter was dried at 40° C. The resultant dry product was analyzed by X-ray diffraction. As a result, it was confirmed that the dry product was composed of dihydrate gypsum in its entirety. Its average particle size was 43 µm so that the raw gypsum had not been modified to such large one as desired in the present invention. Further, the untapped bulk specific density was 1.0, and the aspect ratio was about 2.

Referential Example 2

Modification of neutralization gypsum having an average particle size of 22 µm was conducted in exactly the same manner and under exactly the same conditions as in Example 7 except that the temperature of the slurry in the recrystallization reaction tank was maintained at 60.3° C. Similar to Example 4, after the constant-rate feeding was continued for 24 hours, solid matter of high sedimentation rate was separated by the elutriation method from the slurry discharged from the reaction tank. The separated solid matter was dried at 40° C. The resultant dry product was analyzed by X-ray diffraction. As a result, it was confirmed that the dry product was composed of dihydrate gypsum in its entirety. From combined water, it was also confirmed that its purity was 99.1%. Its average particle size was also measured. As a result, it was found that the average particle size was 50 μm as opposed to 22 μm before the treatment and was small compared with those in the examples. The untapped bulk specific density was also measured. As a result, the untapped bulk specific density was found to be as light as 0.7. The Hunter's brightness was 87, and the product was a material suited especially as white gypsum.

Referential Example 3

Modification of phosphogypsum having an average particle size of 37 μm was conducted in exactly the same manner and under exactly the same conditions as in Example 3 except that the temperature of the slurry in the recrystallization reaction tank was maintained at 92.0° C. Solid matter of high sedimentation rate was separated by the elutriation method, and the separated solid matter was dried at 40° C. Combined water in the dried product amounted to 11.0%. When analyzed by X-ray diffraction, the peak of hemihydrate gypsum still remained significantly. It was, therefore, confirmed that recrystallization was not completed.

Referential Example 4

Modification of phosphogypsum having an average particle size of 37 μm was conducted in exactly the same manner and under exactly the same conditions as in Example 3 except that the temperature of the slurry in the recrystallization reaction tank was maintained at 60.3° C. Solid matter of high sedimentation rate was separated by the elutriation method, and the separated solid matter was dried at 40° C. The resultant dry product was analyzed by X-ray diffraction. As a result, it was confirmed that the dry product was composed of dihydrate gypsum in its entirety. Its average particle size was 51 μm, and was small compared with the average particle sizes in the examples. Its untapped bulk specific density was 0.7 and was light.

Referential Example 5

Modification of phosphogypsum having an average particle size of 37 μm was conducted in exactly the same manner and under exactly the same conditions as in Example 3 except that the temperature of the slurry in the recrystallization reaction tank was maintained at 70.1° C. Solid matter was separated by the elutriation method, and was then dried at 40° C. The resultant dry product was analyzed by X-ray diffraction. As a result, it was confirmed that the dry product was composed of dihydrate gypsum in its entirety. Its average particle size was 58 μm, and was small compared with the average particle sizes in the examples. In addition, its untapped bulk specific density was 0.9.

Comparative Example

Modification of neutralization gypsum having an average particle size of 22 μm was conducted in exactly the same manner and under exactly the same conditions as in Example 4 except that recrystallization treatment was conducted by making control such that the residence time of the supplied hemihydrate gypsum slurry became 3.5 hours (discharge rate per hour: 28.6%). Similar to Example 4, after the constant-rate feeding was continued for 24 hours, solid matter of high sedimentation rate was separated by the elutriation method from the slurry discharged from the reaction tank. The separated solid matter was dried at 40° C. When analyzed by X-ray diffraction, it was confirmed that dihydrate gypsum and hemihydrate gypsum existed together and recrystallization was not completed.

The treatment conditions employed in these examples, referential examples and comparative example are shown in Table 1, and the characteristics of the resulting gypsum samples are summarized in Table 2.

TABLE 1

| | Primary Production Conditions | | | | | | | |
|---|---|---|---|---|---|---|---|---|
| | Raw material | | Calcination step | | | Recrystallization step | | |
| | | | | Kind of | | Particle size | | Discharge |
| | Particle size (μm) | Brightness | Method | hemihydrate gypsum after calcination | Habit Modifier, etc. | of seed crystals (μm) | Recrystalliation temp. (° C.) | Residence time (hrs) | rate per hour (%) |
|---|---|---|---|---|---|---|---|---|---|
| Ex. 1 | 28 | 71 | Dry | 5.2% combined water, β-type | Na gluconate | 28 | 80.3 | 5.9 | 16.9 |
| Ex. 2 | 32 | | Dry | 6.3% combined water, β-type | Maleic acid | 32 | 83.0 | 5.4 | 18.5 |
| Ex. 3 | 37 | | Dry | 6.1% combined water, β-type | Succinic acid | 37 | 84.8 | 5.4 | 18.5 |
| Ex. 4 | 22 | 72 | Wet | 6.1% combined water, α-type | Na succinate | 22 | 85.2 | 5.5 | 18.2 |
| Ex. 5 | 23 | | Wet | 6.1% combined water, α-type | Na succinate | 23 | 85.4 | 8.0 | 12.5 |
| Ex. 6 | 25 | | Wet | 6.2% combined water, α-type | Na succinate + activator | 25 | 85.1 | 6.0 | 16.7 |
| Ex. 7 | Conditions of Ex. 4 + addition of 0.1% of naphthalene-sulfonate-based surfactant | | | | | | | | |
| Ex. 8 | Conditions of Ex. 4 + addition of 0.1% of polyether-based defoaming agent to slurry before calcinations | | | | | | | | |
| Ex. 9 | Similar to conditions of Ex. 4 except for the change of added amount of seed crystals from 0.6% to 2% | | | | | | | | |
| Ex. 10 | Similar to conditions of Ex. 4 except for the change of added amount of seed crystals from 0.6% to 4.8% | | | | | | | | |
| Ex. 11 | Similar to conditions of Ex. 4 except for the change of concentration of Na succinate from 0.5% to 0.1% | | | | | | | | |
| Ref. Ex. 1 | Similar to conditions of Ex. 4 except for the change of added amount of seed crystals from 0.6% to 10% | | | | | | | | |

TABLE 1-continued

Primary Production Conditions

| | Raw material | | Calcination step | | | Recrystallization step | | | |
|---|---|---|---|---|---|---|---|---|---|
| | Particle size (μm) | Brightness | Method | Kind of hemihydrate gypsum after calcination | Habit Modifier, etc. | Particle size of seed crystals (μm) | Recrystalliation temp. (° C.) | Residence time (hrs) | Discharge rate per hour (%) |
| Ref. Ex. 2 | Similar to conditions of Ex. 7 except for the change of slurry temperature in recrystallization reaction tank from 85.2° C. to 60.3° C. | | | | | | | | |
| Ref. Ex. 3 | Similar to conditions of Ex. 3 except for the change of slurry temperature in recrystallization reaction tank from 84.8° C. to 92.0° C. | | | | | | | | |
| Ref. Ex. 4 | Similar to conditions of Ex. 3 except for the change of slurry temperature in recrystallization reaction tank from 84.8° C. to 60.3° C. | | | | | | | | |
| Ref. Ex. 5 | Similar to conditions of Ex. 3 except for the change of slurry temperature in recrystallization reaction tank from 84.8° C. to 70.1° C. | | | | | | | | |
| Comp. Ex. | Similar to conditions of Ex. 4 except for the change of residence time to 3.5 hrs (draw rate per hour: 28.6%) | | | | | | | | |

TABLE 2

Evaluation Results (Characteristics of Modified Dihydrate Gypsum)

| | Average particle size (μm) | Bulk specific gravity | Brightness | Purity (%) |
|---|---|---|---|---|
| Ex. 1 | 86 | 0.9 | 71 | 97.5 |
| Ex. 2 | 133 | 1.1 | | 99.0 |
| Ex. 3 | 109 | 1.0 | | 98.8 |
| Ex. 4 | 138 | 1.2 | 73 | 99.2 |
| Ex. 5 | 142 | 1.0 | | 99.6 |
| Ex. 6 | 132 | 1.2 | | 99.1 |
| Ex. 7 | 136 | 1.2 | 90 | 99.2 |
| Ex. 8 | 137 | 1.2 | 91 | 99.3 |
| Ex. 9 | 87 | 1.1 | | 99.2 |
| Ex. 10 | 64 | 1.0 | | 99.1 |
| Ex. 11 | 101 | 0.7 | | 99.2 |
| Ref. Ex. 1 | 43 | 1.0 | | |
| Ref. Ex. 2 | 50 | 0.7 | 87 | 99.1 |
| Ref. Ex. 3 | Incomplete recrystallization | | | |
| Ref. Ex. 4 | 51 | 0.7 | | |
| Ref. Ex. 5 | 58 | 0.9 | | |
| Comp. Ex. | Incomplete recrystallization | | | |

The invention claimed is:

1. A process for modifying dihydrate gypsum, comprising:
a calcination step of subjecting the dihydrate gypsum as a starting raw material to calcination so as to convert the dihydrate gypsum into hemihydrate gypsum;
a recrystallization step of forming a first slurry comprising the hemihydrate gypsum, which has been obtained in the calcination step, contained as solid matter therein, hydrating the hemihydrate gypsum, and recrystallizing the hemihydrate gypsum in the first slurry in the presence of at least one material selected from the group consisting of a surfactant and a defoaming agent so as to modify the hemihydrate gypsum into recrystallized dihydrate gypsum having a higher brightness compared with the dihydrate gypsum as the starting raw material, thereby forming a second slurry; and
then an impurity separation step of removing the impurities comprising the darkness components, which provide darkness to the modified dihydrate gypsum, from the second slurry comprising the recrystallized dihydrate gypsum by a water-elutriation method, so as to form the modified dihydrate gypsum in a form of a third slurry,
wherein a solid content of the first slurry is in a range from 10 to 50 mass %, and
the water-elutriation method separates and eliminates the impurities from the second slurry by using a difference of a sedimentation rate between crystals in the modified dihydrate gypsum and the impurities, and discharging supernatant water containing the impurities.

2. The process according to claim 1,
wherein in the recrystallization step, the at least one material is incorporated in an amount range from 0.01 to 0.2 wt % based on the dihydrate gypsum as the raw material.

3. The process according to claim 1, wherein the impurity separation step further comprises:
adding water to the recrystallized dihydrate gypsum separated from the darkness components by the elutriation method, and thereby forming the modified dihydrate gypsum into the third slurry; and
then dewatering and washing the modified dihydrate gypsum into a final product.

4. The process according to claim 1,
wherein the surfactant comprises at least one surfactant selected from the group consisting of alkylbenzene-sulfonate-based surfactants, alkyl-sulfate-based surfactants, alkyl-ether-sulfate-based surfactants, ligninsulfonate-based surfactants, naphthalene-sulfonate-based surfactants, bisphenol-based surfactants, and polycarboxylate-based surfactants.

5. The process according to claim 1,
wherein the defoaming agent comprises at least one defoaming agent selected from the group consisting of polyether-based defoaming agents, fatty-acid-ester-based defoaming agents, mineral-oil-based defoaming agents, silicone-based defoaming agents and emulsion-based defoaming agents.

6. The process according to claim 1,
wherein the calcination step, the recrystallization step and the impurity separation step are continuously conducted in this order.

7. The process according to claim 1, wherein the process is a continuous process.

8. The process according to claim 1, in which the hemihydrate gypsum is modified into the modified dihydrate gypsum continuously by supplying the hemihydrate gypsum continuously or intermittently to the recrystallization step, and separating the recrystallized dihydrate gypsum from the darkness components so as to form the modified dihydrate gypsum in the form of the third slurry continuously or intermittently.

9. The process according to claim 1,
wherein the first slurry used in the recrystallization step has pH in a range of 7.0±2.0.

10. The process according to claim 1, further comprising:
removing water from the modified dihydrate gypsum in the third slurry so as to form dewatered modified dihydrate gypsum.

11. A process for modifying dihydrate gypsum, comprising:
- a recrystallization step of forming a first slurry comprising hemihydrate gypsum contained as solid matter therein, hydrating the hemihydrate gypsum, and recrystallizing the hemihydrate gypsum in the first slurry in the presence of at least one material selected from the group consisting of a surfactant and a defoaming agent so as to modify the hemihydrate gypsum into recrystallized dihydrate gypsum thereby forming a second slurry; and
- then an impurity separation step of removing the impurities comprising the darkness components, which provide darkness to the modified dihydrate gypsum, from the second slurry comprising the recrystallized dihydrate gypsum by a water-elutriation method, so as to form the modified dihydrate gypsum in a form of a third slurry,
- wherein a solid content of the first slurry is in a range from 10 to 50 mass %, and
- the water-elutriation method separates and eliminates the impurities from the second slurry by using a difference of a sedimentation rate between crystals in the modified dihydrate gypsum and the impurities, and discharging supernatant water containing the impurities.

12. The process according to claim 11, further comprising:
- removing water from the modified dihydrate gypsum in the third slurry so as to form dewatered modified dihydrate gypsum.

* * * * *